(12) United States Patent
Van Berlo et al.

(10) Patent No.: US 11,447,059 B2
(45) Date of Patent: Sep. 20, 2022

(54) METHOD AND SYSTEM FOR SECURING HEAVY LOADS

(71) Applicant: CORDSTRAP B.V., Oostrum (NL)

(72) Inventors: Perry Van Berlo, Oostrum (NL); Elmo Diederiks, Oostrum (NL)

(73) Assignee: CORDSTRAP B.V., Oostrum (NL)

( * ) Notice: Subject to any disclaimer, the term of this patent is extended or adjusted under 35 U.S.C. 154(b) by 0 days.

(21) Appl. No.: 16/633,083

(22) PCT Filed: Jul. 24, 2017

(86) PCT No.: PCT/EP2017/000894
§ 371 (c)(1),
(2) Date: Jan. 22, 2020

(87) PCT Pub. No.: WO2019/020154
PCT Pub. Date: Jan. 31, 2019

(65) Prior Publication Data
US 2020/0171997 A1     Jun. 4, 2020

(51) Int. Cl.
  *B60P 7/08*     (2006.01)
  *B61D 45/00*    (2006.01)
  *B65D 90/00*    (2006.01)

(52) U.S. Cl.
  CPC .......... B60P 7/0807 (2013.01); B61D 45/001 (2013.01); *B60P 7/0869* (2013.01); *B65D 90/0053* (2013.01); *B65D 2590/005* (2013.01); *B65D 2590/0058* (2013.01)

(58) Field of Classification Search
  CPC ..... B60P 7/0807; B60P 7/0869; B60P 7/0815; B60P 7/08; B61D 45/001; B65D 90/0053; B65D 2590/005; B65D 2590/0058; B65D 71/04; B65D 81/053; B65D 81/054; B65B 13/181
  USPC .............................. 410/41, 99, 106, 109, 112
  See application file for complete search history.

(56) References Cited

U.S. PATENT DOCUMENTS

| | | | | |
|---|---|---|---|---|
| 2,583,257 | A | * | 1/1952 | Dietrichson ......... B61D 45/002 410/109 |
| 4,887,946 | A | * | 12/1989 | Sevier ...................... B60P 7/06 410/32 |
| 5,518,348 | A | * | 5/1996 | Tucker .................. B60P 7/0869 410/41 |
| 7,431,547 | B2 | * | 10/2008 | Geary ...................... B60P 3/42 410/41 |
| 7,556,463 | B1 | * | 7/2009 | Hall ...................... B60P 7/0815 410/104 |
| 2002/0094252 | A1 | | 7/2002 | Nadherny et al. |
| 2014/0003878 | A1 | | 1/2014 | Knox et al. |

(Continued)

FOREIGN PATENT DOCUMENTS

| | | |
|---|---|---|
| DE | 20 2010 011440 | 8/2010 |
| WO | 2014/154774 | 10/2014 |

*Primary Examiner* — Stephen T Gordon
(74) *Attorney, Agent, or Firm* — Ice Miller LLP

(57) ABSTRACT

The current invention concerns a device for securing a load in a container. In an embodiment of the current invention, such a device comprises a leaf having a front and a rear main surface, and an aperture extending between said main surfaces for receiving a strap, whereby said rear main surface comprises a protrusion. In a further aspect, the invention is directed towards a method for securing a load, which method employs such a device.

20 Claims, 13 Drawing Sheets

(56) References Cited

U.S. PATENT DOCUMENTS

2016/0031359 A1* 2/2016 Parrin .................. B60P 7/0823
410/98

* cited by examiner

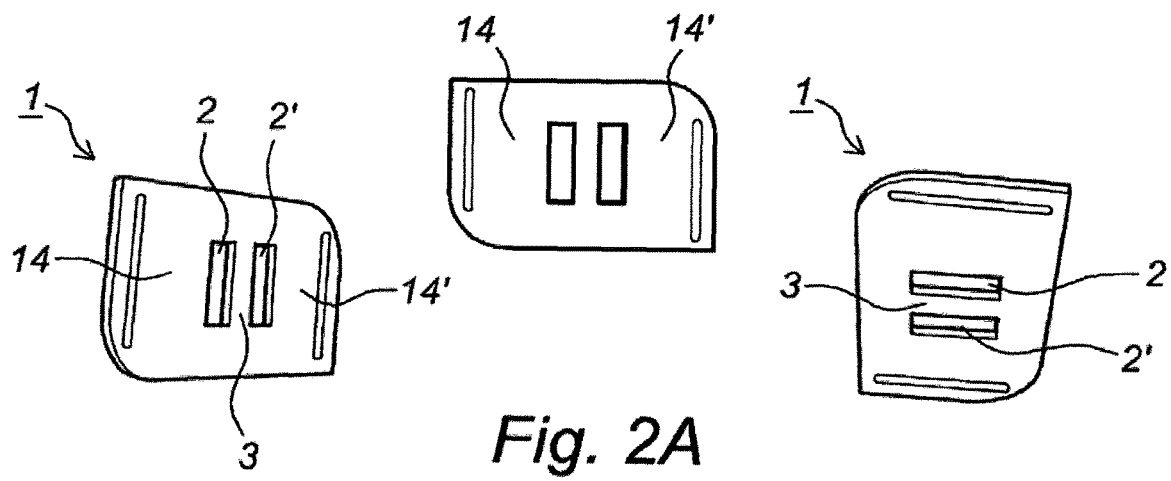
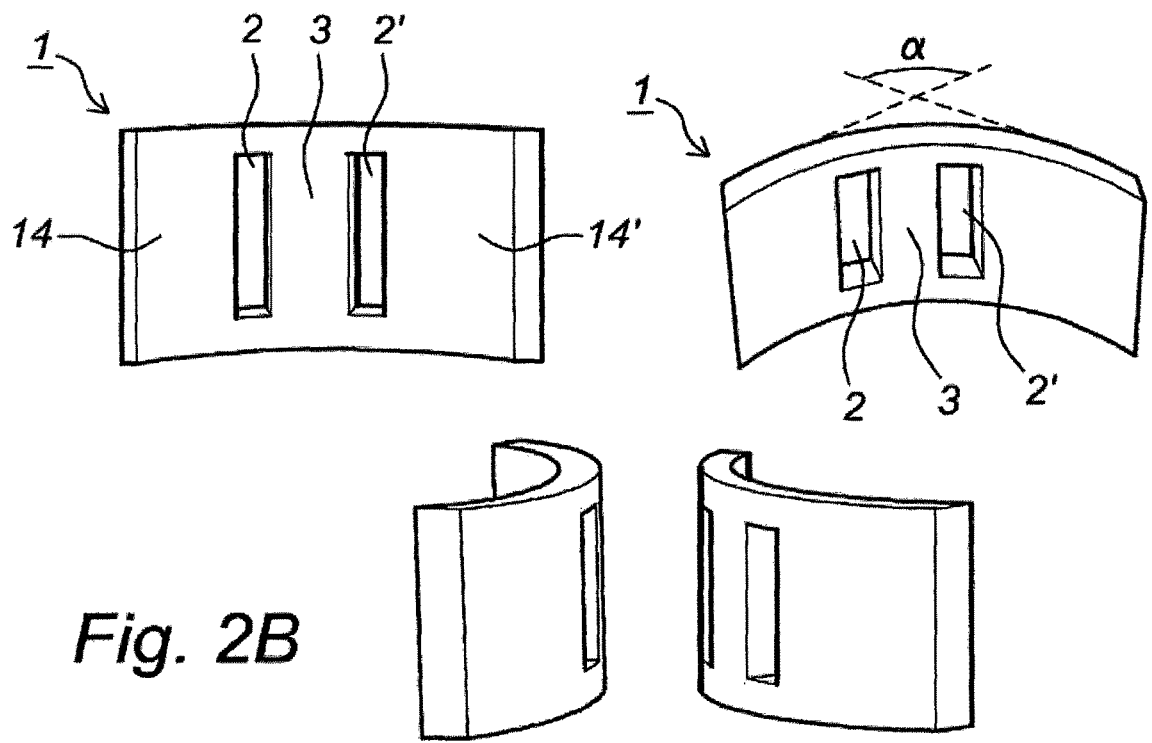

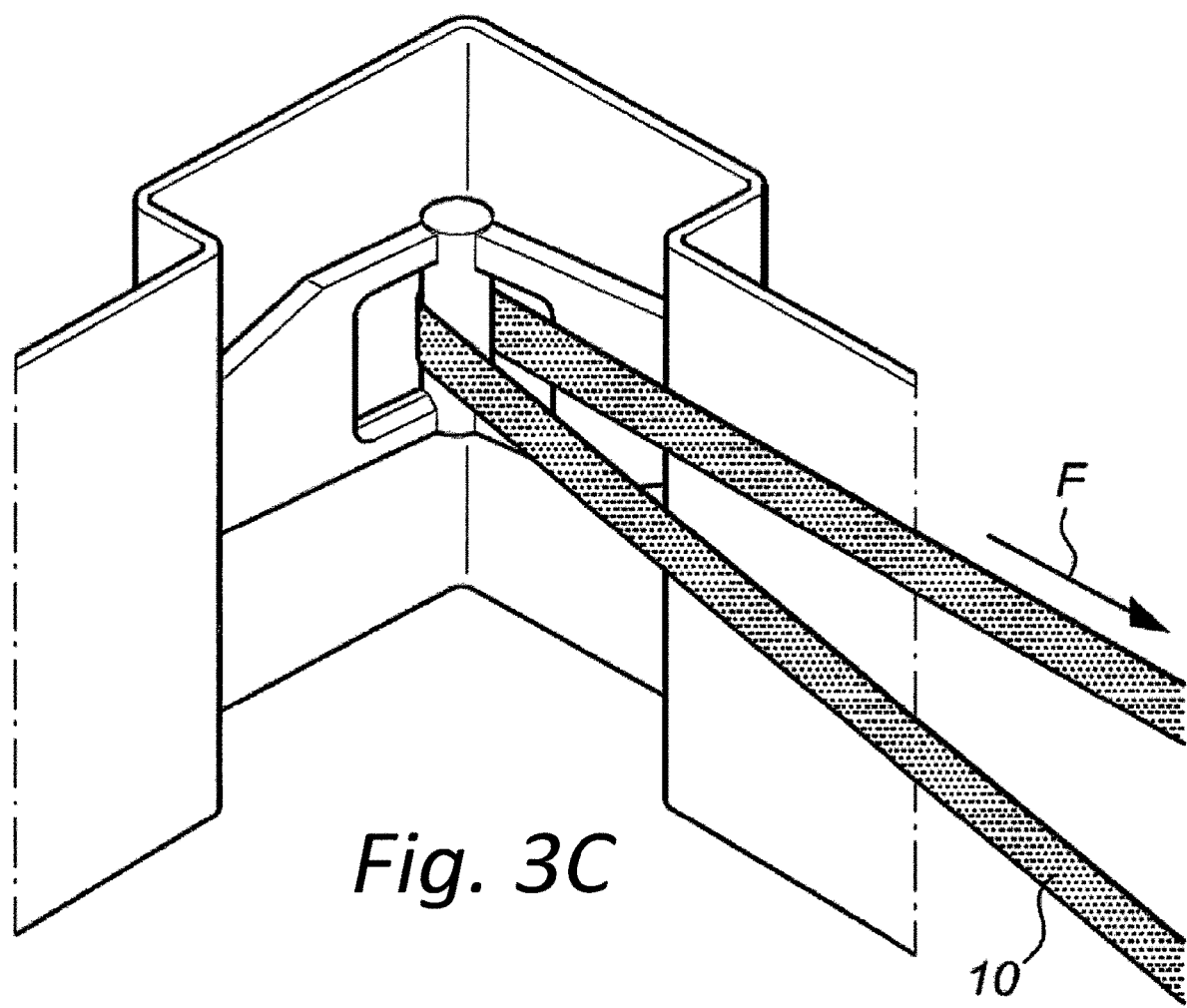

METHOD AND SYSTEM FOR SECURING HEAVY LOADS

CROSS-REFERENCE TO RELATED PATENT APPLICATIONS

This is a U.S. National Phase Application under 35 U.S.C. § 371 of International Patent Application No. PCT/EP2017/000894, filed Jul. 24, 2017, which is incorporated by reference in its entirety. The International Application was published on Jan. 31, 2019, as International Publication No. WO 2019/020154 AI.

TECHNICAL FIELD

The invention pertains to the technical field of methods and systems for securing heavy loads in a container.

BACKGROUND

Cargo stowed in ocean shipping containers must be secured to prevent shifting in any direction, particularly towards the doors. Voids between individual cargo units and/or container walls must be filled and/or cargo can be secured against falling, tipping and sliding by using multiple lashing and anchor points provided on the top and bottom side rails and on the corner posts. These lashing points generally comprise rings (e.g. D-rings) which allow the passage of straps or ropes used for securing the load.

EP 2 978 634 A1 describes a wall securement device that is attachable to the inner rigid structure of a container corner post. The device thereby defines a lashing point, allowing the passage of straps.

The present invention aims to provide an improved wall securement device. By preference, said wall securement device should be time and money saving, easy to use and have the potential to be generally accepted by International Regulatory Authorities.

SUMMARY OF THE INVENTION

In a first aspect, the present invention discloses a wall securement device for securing a load in a container. The wall securement device comprises at least two leaves having a front and rear main surface, whereby at least one of said leaves comprises at least one aperture extending between its front and rear main surface; the device comprises two such apertures for receiving a strap. In particular, the rear main surface of said leaf comprises a protrusion.

In a second aspect, the present invention discloses a method for securing a load in a container, by use of a wall securement device according to the first aspect of the invention.

As a consequence of the presence of said protrusion, is that the ease of application of the device is greatly enhanced. Additionally, the protrusion ensures a proper lock-in of the device. Furthermore, the stability of the lashing arrangement is significantly increased. Preferably, the protrusion is such that, when the device is arranged to a corner post of a container, at least a part of the protrusion is arranged against the corner profile of said corner post. It is further preferred that the protrusion is a rigid and solid, rearwardly protruding portion of the wall securement device. A main function is thereby to assist in transferring, towards said corner posts, a significant portion of the pulling forces exerted by straps to the wall securement device.

DESCRIPTION OF FIGURES

FIGS. 2A to 2F show potential embodiments of a wall securement device according to the prior art.

FIG. 3C shows a device according to a possible embodiment of the current invention, placed in a corner post of a container and provided with straps which secure a load.

DETAILED DESCRIPTION OF THE INVENTION

Figure 1:
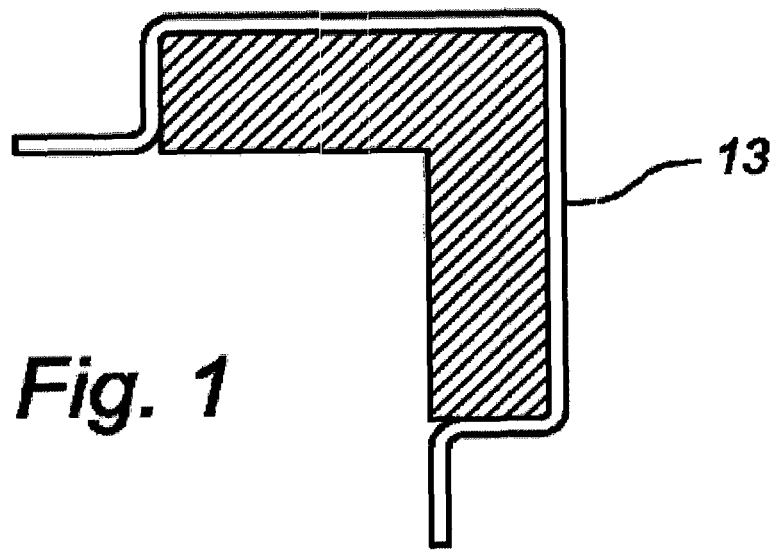
FIG. 1 gives a schematic overview of a corner post profile of a container; a shaded area indicates the preferred position of a device according to the current invention.

The present invention concerns a method for securing cargo load in a container as well as a wall securement device capable to be used in this method. The latter enables an easy and time-saving way to securing goods to a container, thereby ensuring that said goods are adequately secured. Moreover, it is the purpose of the current invention to provide an easy-to-use and performant alternative for the well-known lashing and anchor points of the prior art, such as D-rings. It is the aim of the current invention to provide a system which is thus reliable that it will pass all regulatory requirements and hence may be used for a variety of loads which are currently excluded by the prior art lashing points. Moreover, it is also the object of the current invention to provide a method and system which is cost-saving for the client.

EP 2 978 634 A1, the entire content of which is included herein by reference, describes a wall securement device that is attachable to the inner rigid structure of a container corner post. The device thereby defines a lashing point, allowing the passage of straps.

In particular, as a consequence of the rear main surface of the device comprising a protrusion according to the present invention, the wall securement device can be arranged in an even more convenient fashion to a corner profile of a container, as compared to wall securement devices according to the state of the art. The protrusion makes sure that the element is conveniently positioned in a most optimal way.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a compartment" refers to one or more than one compartment.

"About" as used herein referring to a measurable value such as a parameter, an amount, a temporal duration, and the like, is meant to encompass variations of +/−20% or less, preferably +/−10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" refers is itself also specifically disclosed.

"Comprise," "comprising," and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

The term "wall" may include a wall and a corner post.

The recitation of numerical ranges by endpoints includes all numbers and fractions subsumed within that range, as well as the recited endpoints.

The expression "% by weight" (weight percent), here and throughout the description unless otherwise defined, refers to the relative weight of the respective component based on the overall weight of the formulation.

The terms "wall securement device" and "securement device" as used herein, can be interchanged, In a first aspect, the present invention concerns a wall securement device attachable to an inner rigid structure of a container that comprises a sidewall and a corner post to secure a load in the container, the wall securement device comprising at least two leaves, said leaves having a front main surface and a rear main surface, and further having a contact surface extending between the front and rear main surfaces, the contact surface being formed at a tip portion of the wall securement device to contact a profile of the corner post, wherein at least one of said leaves comprises at least one aperture that extends between the front and rear main surfaces, said device comprises at least two such apertures to receive a strap. In particular, the rear main surface of the leaf comprises a protrusion.

The wall securement device is thereby configured for being arranged to a corner post of the container. Within the context of the present invention, the "rear main surface" of a leaf should be interpreted as the main surface thereby substantially pointing away from the main container loading area (i.e. the bulk of the container), when being positioned at a corner post. On the other hand, the "front main surface" should be interpreted as the main surface thereby substantially pointing towards the main container loading area. In case the device can be arranged to the corner post in multiple ways, such that its front and rear main surfaces are in fact interchangeable, at least one of the main surfaces of at least one leaf of the device comprises a protrusion, the "rear main surface" of said leaf being one of those main surfaces.

In a similar fashion, it is possible to define a "rear side" and a "front side" with respect of a wall securement device according to the present invention. Respectively, the rear and front main surfaces thereby substantially point towards the rear and front sides of the device.

The device is specifically suited for lashing loads in heavy freight in containers which are located on transport means. By preference such transport means may be a waterborne vessel such as a container ship, ground vehicle such as truck or railcar, or an airborne vessel such as an airplane.

These wall securement devices are to be attached to the inner structure, being the inner wall of the container, preferably a corner post comprised by the inner wall of the container, and will serve as anchoring or passage points for securing means used for lashing the cargo load. In a preferred embodiment, said wall securement device is attached to the corner posts of the container. By preference, said device is attached to the corner profile of such corner posts. Such containers comprise a steel framework, consisting of four corner posts. These corner posts serve as the load-carrying elements of containers. The steel framework furthermore comprises two bottom side rails, two top side rails, two bottom cross members, a front top end rail and a door header. The side and end walls and the roof are the components of a standard box container which are capable of bearing the least load. The corner posts provide enough strength for allowing the attachment of the wall securement device according to the current invention, thereby equally providing sufficient sturdy points to allow the anchorage of securing means and bearing the load. Attachment may be physical or mechanical. Attachment may include the physical clamping of the device to the corner profile of the corner post. This ensures also that the device does not hinder or interfere with the cargo within the container. In an embodiment of the current invention, the wall securement device may be removably attached to the container. With the term "removably attached" is meant the device is connected to the wall by means which allow easy attachment or detachment, without the use of tools such as screwdrivers, nails, screws and the like. Such removable attachment may comprise one or more attachment aids such as adhesive strips, foam elements, spring-type elements, glue or glue-like material or make use of magnetic force. In a preferred embodiment, said attachment aid comprises a clamp, a spring or a foam element, which is positioned between the wall of the corner post and the device. Most preferably, said attachment aid is a foam element, connected to the rear of said device. Said foam element comprises preferably compressible foam.

Alternatively, said wall securement device may be permanently fixed to the container by conventional means such as welding.

The wall securement device may be adjustable in position, meaning that the position of the device may be adjusted in view of the top and bottom of the container, e.g. lowered or increased. For the latter purpose, a rail system may be provided at the corner posts, with fastening means for the device onto the rail which allows altering the position of the device with respect to top of bottom of the container.

In a preferred embodiment, the securement devices are located in one vertical plane in view of the roof or floor wall of the container, meaning that they are all provided at one side of the container. By preference, they are provided at the corner posts at the end wall of the container opposite to the door(s). For instance, a strap is used for securing the load, said strap being looped through at least one aperture of at least one load securement device at a corner post at the front side of the container, its strap ends going around the load towards the back of the container, along either side of the load, whereby these strap ends are closed using a buckle at said back of the container. Quite conveniently, the buckle can be reached via the front side opening. Preferably, each securement device comprises at least two apertures, through which apertures the strap is looped. In the most preferred configuration, each corner post of this end wall will be provided by at least one wall securement device. By preference, 2 devices are provided at each corner post, whereby one of the devices is preferably located towards the top of the container and one located towards the floor of the container.

During lashing of the load, securing means are passed through an aperture of the wall securement device. The wall securement device can comprise one or more apertures. In an embodiment of the invention, the wall securement device comprises one or more leaves, at least one of those leafs, and preferably each leaf defining an aperture, which aperture extends between its front and rear main surfaces. In a further embodiment, the device comprises two leaves, each of both leaves comprising such an aperture. Securing means such as straps can be passed through a first aperture of the wall securement device and subsequently through a second aperture of said same wall securement device, in a direction opposite to the first path of said securing means. Such securing means are by preference straps, such as steel straps, polypropylene straps or polyester straps with or without a polymer coating. By preference, the system and method is used in conjunction with polyester straps, comprising polyester yarns, either woven or composite yarns. Straps produced of composite yarns will by preference be coated in a polymer coating such as polypropylene or polyethylene. The loose ends of the securing means are joined by means of a buckle. By preference, such a buckle is manufactured from high quality steel and is provided by measures that avoid or entirely prevent slipping. Throughout this document, the term "strap" will be employed when referring to securing means of any kind. Obviously, the skilled person is more than qualified to select a suitable alternative securing means, for use in conjunction with the wall securement device.

In a preferred embodiment, said wall securement device can bear a load of at least 6 ton (absolute value) when provided with securing means. The applied force on the securing means will run opposite to the direction of the first path of the securing means and parallel to the second path.

The wall securement device is specifically designed to be attached to a corner post and to fit in the corner profile of said post. The wall securement device may be manufactured from metals such as high quality steel, stainless steel, aluminum or plastic. In a preferred embodiment, the wall securement device has two or more apertures allowing the passage of securing means such as straps.

In a preferred embodiment of the device, the rear main surface of at least one leaf comprises a protrusion. Preferably, said rear main surface is substantially flat or only slightly curved. A "protrusion", within the context of the present invention, should be seen as a part of the rear main surface protruding towards the rear side of the device, or alternatively as a rearwardly protruding element that is provided at said rear main surface. The "protrusion" thereby preferably disrupts the substantially flat or only slightly curved nature of the rear main surface.

Preferably, the protrusion is such that, when the device is arranged to a corner post of a container, at least a part of the protrusion is arranged against the corner profile of said corner post. Alternatively, this is only the case where a sufficiently large pulling force is additionally applied to said device, via one or more lashing straps, due to some (elastic) deformation of the device as a result thereof. In any case, the protrusion significantly increases the stability of the lashing arrangement.

Preferably, the protrusion is a rigid and solid, rearwardly protruding portion of the wall securement device. Its principle function thereby differs from, for instance, the one of a foam or spring-type attachment aid as described below; being the prevention of a well-arranged wall securement device from sliding down. Preferably, the protrusion rather (or additionally) assists in transferring, towards said corner posts, a significant portion of the pulling forces exerted to the wall securement device via straps. Preferably, the protrusion is integrally formed with the remainder of the leaf, and more preferably the protrusion is integrally formed with the remainder of the device.

According to a further or alternative embodiment of the device, the protrusion comprises a slope portion. Within the context of the present invention, a "slope portion" should be seen as a portion flanking the protrusion and angling up to said protrusion. A protrusion having at least one slope portion, has the advantage of not hindering the ease of application of the device at a corner post of the container, as will be appreciated when consulting the embodiments of the present invention. In particular, the slope portion allows the device to be inserted into the corner profile at an angle. Subsequently it is tilted and thereby locked into position. On the other hand, protrusion can still transfer a major share of the pulling/lashing forces towards the corner profile. Preferably, the slope portion extends along a side of the protrusion, when considering the protrusion extending somewhere between the "origin" of the leaf (near the "intersection", as will be described further below), and the "tip portion" of the leaf.

According to a further or alternative embodiment of the device, the protrusion comprises a tip portion. Within the context of the present invention, a "tip portion" should be seen as a portion covering at least a part of the tip end of the leaf. The protrusion thereby extends towards said tip end of the device. Preferably, the protrusion thereby provides, near the tip end of the device, a portion for contacting the corner profile. This further increases the stability of the arrangement.

According to a further or alternative embodiment of the device, the protrusion extends to at least a part of the above-mentioned contact surface, at the tip end of the device. As a consequence, said part of the contact surface will feature a profiled (i.e. non-straight) cross-section, when inspecting the device tip end from its end face. Structures featuring profiled cross-sections are known to better resist against bending and torsion, for the same amount of material. Quite advantageously, a protrusion extending to a part of the contact surface at the tip end of the device, increases the strength and rigidity of said contact surface.

According to a further or alternative embodiment of the device, the protrusion is a bump. In other words, the rear main surface of the device thereby curvingly deforms into said protrusion. Within the context of the present invention, a "bump" should be understood as a section of/at the rear main surface, which section evolves into a rearwardly protruding surface section. The bump is still disruptive, as compared to the main, flat or slightly curved course of the rear main surface. However, there are preferably no discontinuities, such as sharp edges, separating the bump from the remainder main surface. Advantages are that such devices are easier to clean and safer, because they do not comprise sharp edges. Moreover, they can be arranged in a more convenient fashion, since the bump can be slidingly guided, along the surface of the corner profile. According to a further embodiment, the protrusion is a bump, featuring slope portions at one or both sides.

A further advantage of a bump is that the device can be used more broadly, given variations in corner post dimensions.

According to a further, preferred embodiment of the device, the protrusion is integrally formed with the material of the rear main surface. For instance, the device may be produced as a metal device for instance produced by molding or casting, which device comprises the protrusion and at least one leaf. Alternatively, the protrusion is formed by denting the leaf towards the rear side. Other suitable fabrication techniques for realizing a leaf having a protrusion are possible. In a possible embodiment, the entire device is produced as one integral part.

According to a further or alternative embodiment of the device, said device does not extend beyond an inner zone of the corner post, when arranged to said corner post. This is advantageous for lashing the load within the container.

According to a further or alternative embodiment of the device, said device comprises a first leaf comprising a first aperture and a second leaf comprising a second aperture.

According to a further or alternative embodiment of the device, said leaf and said another leaf form an inner angle of between about 45° and about 180°. In this regard, two leaves forming an inner angle of about 180° may alternatively be interpreted as a single leaf. Similarly, a curved device in which no distinction can be made between a first and second leaf, may also be seen as a device comprising a single, curved leaf. Preferably, such a single leaf comprises two apertures, for receiving a strap.

According to a further or alternative embodiment of the device, said leaf and said another leaf form an inner angle of between about 90° and about 120°.

According to a further or alternative embodiment of the device, said device further comprises an intersection that supports a portion of the strap when passed through the aperture. The apertures are separated by an intersection, used as support for the straps when passed through these apertures. Said apertures are part of separate leaves of the device. Said intersection may comprise a flat, a rounded or rugged element. In a preferred embodiment, said intersection comprises a cylindrical element such as a bar or rod. In an embodiment, this intersection is positioned in a direction substantially reverse to the direction of strain of said securing means. Typically, said direction of strain has an angle varying between 15° upwards and 15 downwards, as compared to the horizontal plane. As such, the device provides both for an anchorage point for the strap as well as for a load bearing point. The position of the intersection in view of the strain direction is chosen such that the straps are given an adequate support by the intersection during lashing.

According to a further or alternative embodiment of the device, the intersection extends in a direction traversing a direction of strain of the strap.

The device and preferably the region of the intersection may be provided by a peripheral roughening. Such peripheral roughening or abrasive surface may comprise for instance a specific pattern (e.g. grid), embossed in the material of the intersection or by coating the intersection or entire device by a grit material coating. Such peripheral roughening will prevent slipping of the strap. The device may furthermore also be provided by means for attachment to a load surface. Attachment to the container may be removable or permanent. In a preferred embodiment, said peripheral roughening is located on the intersection of the leaf and said another leaf.

As pointed out, the wall securement device is provided by apertures for passage of the straps. By preference, each wall securement device has two apertures. In one embodiment, the apertures comprise between 10 and 80%, of the total surface of said wall securement device. By preference, said apertures comprise between 25 and 60% of the total surface of the device. The latter ensures easy passage and even multiple passages of the straps through the apertures, meanwhile ensuring that the device still withstands the forces applied onto the device when cargo is secured by aid of the devices.

In a further embodiment, each aperture is located in a plane of said wall securement device, said planes are virtual planes, preferably tangent planes, formed by the separate leaves of the device, whereby said planes form an inner angle α of between 45° and 180°, preferably between 90 and 180°, more preferably between 100° and 180°, more preferably between 100° and 150°, more preferably between 100° and 120°, even more preferably between 100° and 110°. Hence, the latter allows for a specific configuration of the device allowing attachment of the device to the wall of the corner posts of the container.

Preferably, the "inner angle" is the smallest angle that is spanned between imaginary tangent planes to the respective front main surfaces of the leaves, the tangents taken at near the tip portions of said leaves. Similarly, the "outer angle" is preferably the largest angle that is spanned between imaginary tangent planes to the respective rear main surfaces of the leaves. An advantage is that the device, when arranged to a corner post, provides a lashing point within the enclosure of the typical container corner profile, without bulging out towards the main, substantially beam-shaped storage space of the container. In other words, the device does not extend beyond an inner zone of the corner post. As such, the wall securement devices pose no restrictions to efficiently stacking a load of (beam-shaped) goods within said storage space, especially near the corner posts.

By preference, said device comprises two leaves, which are connected to each other at the level of the intersection. Said leaves preferably form an angle of between 45° and 180°, preferably between 90 and 180°, more preferably between 100° and 180°, more preferably between 100° and 150°, more preferably between 100° and 120°, even more preferably between 100° and 110°. In a most preferred embodiment, said angle comprises between 100° and 105°, such as 100°, 101°, 102°, 103°, 104° or 105°. It was found by the inventors that an angle in this range allows adequate positioning of the device to the corner post, as well as ensures passing of the securing means through the apertures.

In an embodiment, said leaf of the device comprises a substantially rectangular form. In another embodiment, said leaf comprises a polygon form. In a preferred embodiment, said leaf comprises at least two sides, which intersect and form an obtuse angle at the intersection. As a consequence, said leaves comprise a beveled edge. Said obtuse angle comprises between 91° and 178°, preferably between 95° and 150°, more preferably between 100° and 130°, most preferably between 105° and 120°, such as 118°. By preference, one of said leaves forming the angle will run parallel to the intersection of said device. The latter has been found advantageous for the positioning of the device to the corner profile.

A second leaf, equally forming an intersection with said leaf running parallel to said intersection, will be positioned substantially perpendicular to said parallel side.

In an embodiment, said device will be provided with two leaves, whereby said obtuse angles are placed crosswise or opposite of a virtual symmetry axis formed by the intersection.

When arranging the device to the corner profile, the device may in a first instance be inserted in the corner profile, after which it can be correctly positioned by means of a quarter of a turn or more. It is advantageous that the protrusion comprises a slope portion, and/or that one or more of said leaves have a beveled edge, for being able to perform such a turn of the device.

Thickness of the leaves is preferably between 5 and 15 mm, preferably between 8 and 12 mm, more preferably 10 mm. The length of the leaf will preferably be between 100 and 130 mm, more preferably between 105 and 125 mm. Said length of the leaves of the device may vary. This can be necessary in view of variations in the dimensions of a container corner profile.

Preferably, the intersection will be thicker than said leaves. In a preferred embodiment, said ratio between the thickness of the intersection and the thickness of the leaves will be between 3:1 and 2:1. Said Thickness of the intersection lies preferably between 20 and 30 mm.

According to a further or alternative embodiment of the device, said device further comprises attachment aids, for assisting the attachment of said device to the corner post. Preferably, said attachment aids are present on the rear side of one or both leaves. Such attachment aids provide additional assistance for attachment of the device to the corner profile and may comprise a spring or clamping element, a foam element, magnets or magnetic strips, glue elements. In another embodiment, said attachment aid is a foam element. Said foam element will cover at least partially the rear of said leaf. By preference, said foam element will cover at least 5%, more preferably at least 10%, more preferably 20% of said rear. In another embodiment, said element covers between 1 to 100% of said rear, between 5 to 90%, more preferably between 10 to 90%. Said element may have any conventional shape, such as round, rectangular, square, polygonal.

In a preferred embodiment, said foam element comprises closed cell foam, preferably said closed cell foam has ellipsoid or round cells, most preferably round cells. In a further preferred embodiment, said foam element is a crosslinked polyolefin, such as LDPE or PP. Preferred density of the foam will be between 50 and 100 kg/m$^3$. Said thickness of the foam lies preferably between 10 and 30 mm, more preferably between 15 and 25 mm.

Use of foam as attachment aid was found to be particularly useful because of the compressible nature of said foam. This is important, as the space between the device when positioned and the container wall will vary from point to point. Especially the use of foam with round or substantially round cells was found to be extremely advantageous, as these provide sufficient back pressure, even after considerable time of use. Due to its specific nature, said foam element will also resist dimensional changes due to e.g. temperature differences. Said foam element may be attached to the device by conventional methods, such as gluing, or may simply be placed behind said device when being positioned in the corner post.

In a preferred embodiment, said wall securement device can bear a load of at least 6 ton (absolute value) when provided with securing means.

According to a further or alternative embodiment of the device, said device may comprise at least two leaves having front and rear main surfaces as described above, whereby at least two of said leaves define a protrusion at their rear main surface, similar to what is described above.

In a second aspect, the present invention concerns a method for securing a load in a container using a wall securement device as described above. Said container thereby comprises three side walls, a roof, a floor, and four corner posts, which corner posts define corner profiles, and said method comprises the steps of attaching/arranging said wall securement device to a corner post of the container, passing a strap through an aperture of said device, and lashing said load using said strap. Preferably, a protrusion of said device is thereby arranged to contact the corner profile of said corner post. Preferably, said strap is passed through at least two apertures of said device.

The securing means may run substantially perpendicular to said posts; the securement device may be fixedly attached to the corner posts; the securement device may be removably attached to the corner post; the securement device may be adjustable in position, more specifically adjustable in height; one securement device may be provided; two securement devices may be provided per corner post; three or more securement devices may be provided per corner post; during lashing of the load, the securing means may be passed through a first aperture of the wall securement device and subsequently through a second aperture of the same wall securement device in a direction that may be opposite to the first path of the securing means; the securement device may be located at the corner posts of front wall of the container, opposite to the doors of the container; and/or the container may be located on transport means.

The apertures may comprise between about 10 and 80%, preferably between about 25 and 60% of the total surface of the securement device; the securement device may have two apertures; each aperture may be located in a plane of the securement device, whereby the planes may form an inner angle of between about 45° and about 180°, and preferably between about 90° and about 180°, and more preferably between about 100° and about 110°; the securement device may be provided with a peripheral roughening; the peripheral roughening may be located at the intersection; the securement device may be provided by means for attaching the device to a load surface such as a container; and/or the securement device may be implanted for securing a cargo load in a container.

A container can be provided with one or more wall securement devices, constructed according to the principles of the invention.

A kit can be provided that comprises a securement device according to the invention, and a securing means such as straps and a buckle for joining the securing means. As understood by those skilled in the art, the securing means may include any type of mechanism that may be attached to the securing device according to the principles of the invention. The securing means may include straps comprising polyester yarns; the strap(s) may comprise woven polyester yarns; the strap(s) may comprise composite polyester yarns that may be embedded in a polymer coating, wherein the polymer coating may include polypropylene; the buckle may comprise a body having two side walls and bars extending between these side walls; the bars of the buckle may be provided with a peripheral roughening; at least one of the bars may be provided with a peripheral roughening comprising a serration that may be oriented opposite the strap's direction of strain; and/or the kit may comprise a tensioner for applying a tension on the securing means.

According to a still further aspect, a wall securement device is provided that is attachable to an inner rigid structure of a container that comprises a sidewall and a corner post to secure a load in the container. The wall securement device comprises a leaf having front and rear main surfaces; and a contact surface extending between the front and rear main surfaces, the contact surface being formed at a tip end of the wall securement device to contact a profile of the corner post; and an aperture that extends between the front and rear main surfaces to receive a strap, wherein the rear main surface of the leaf comprises a slope-hook portion. The slope-hook portion may comprise a slope portion. The slope-hook portion may comprise a hook portion. The hook portion may comprise a bump. The term "slope-hook portion" as used herein may be seen as equivalent to "protrusion".

According to a still further aspect of the invention, a wall securement device is provided that comprises: front and rear main surfaces; an aperture that extends between the front and rear main surfaces; and a contact surface extending between the front and rear main surfaces and located at a tip end of the wall securement device, wherein the rear main surface comprises a slope-hook portion. The slope-hook portion may comprise a slope portion and a hook portion. The hook portion may comprise a bump.

The aspects of the current invention will further be elucidated by means of examples and figures, without being limited to these examples or figures.

FIG. 1 shows a detailed view of a corner post (4)/corner profile (13) suitable for receiving a device (1) according to the current invention. The shaded surface (e.g., inner zone of a corner post) represents the optimal position of the device (1) at the corner post. The device (1) may be positioned in the inner zone and not go beyond the inner zone of the corner post, so that it does not interfere with cargo. If not positioned correctly (e.g. outside this position) than the devices risk hindering the load in the container.

FIGS. 2A-2F show potential embodiments of wall securement devices according to the prior art. These devices (1) are all characterized in that they comprise leaves (14, 14') provided with apertures (2), preferably two apertures (2, 2'), which are separated by an intersection (3). The apertures (2, 2') allow passage of the straps (10), whereby the intersection will provide support to the straps. All embodiments show devices with 2 apertures, but it should be understood that multiple apertures, preferable even in number, equally fall under the scope of the current invention.

Figure 2C:
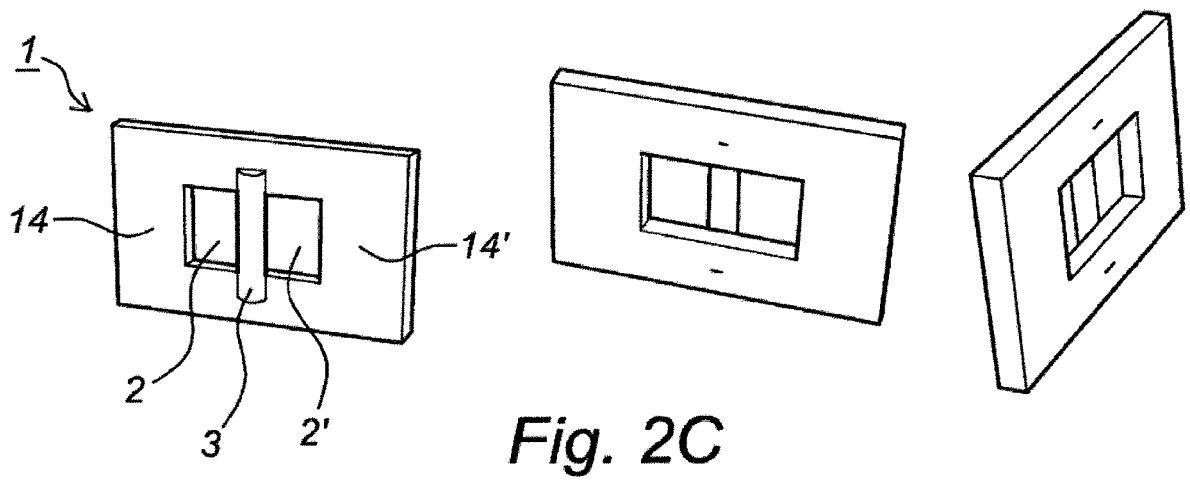

As shown in FIGS. 2A and 2C, the securement device (1) may be essentially flat, whereby each of the two apertures (2, 2') lie in a virtual plane which forms an angle of 180°. The device may be rectangular or square, and may be provided with rounded corners such as a hysteresis form.

In another embodiment, as shown in FIG. 2B, the securement device (1) may have a curvature.

Figure 2D:
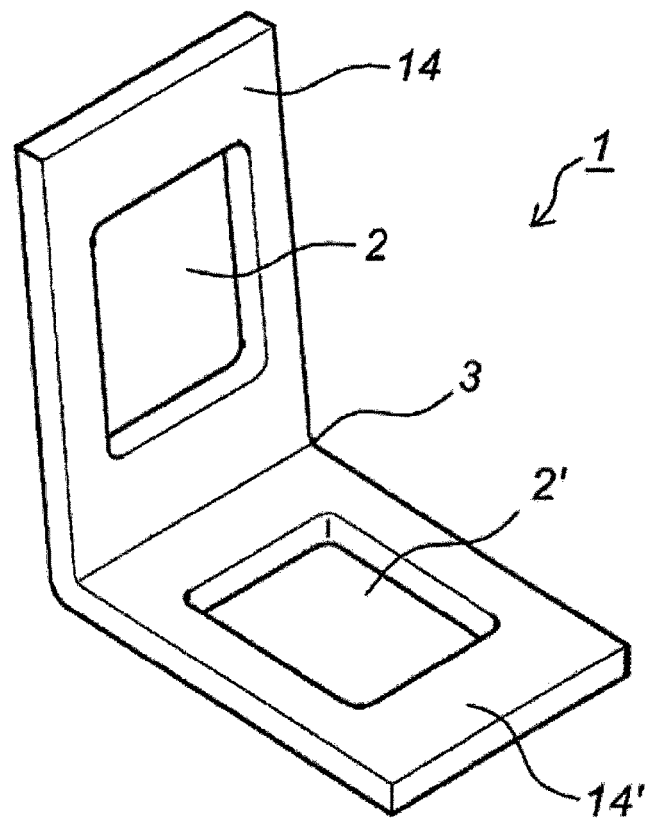
Figure 2E:
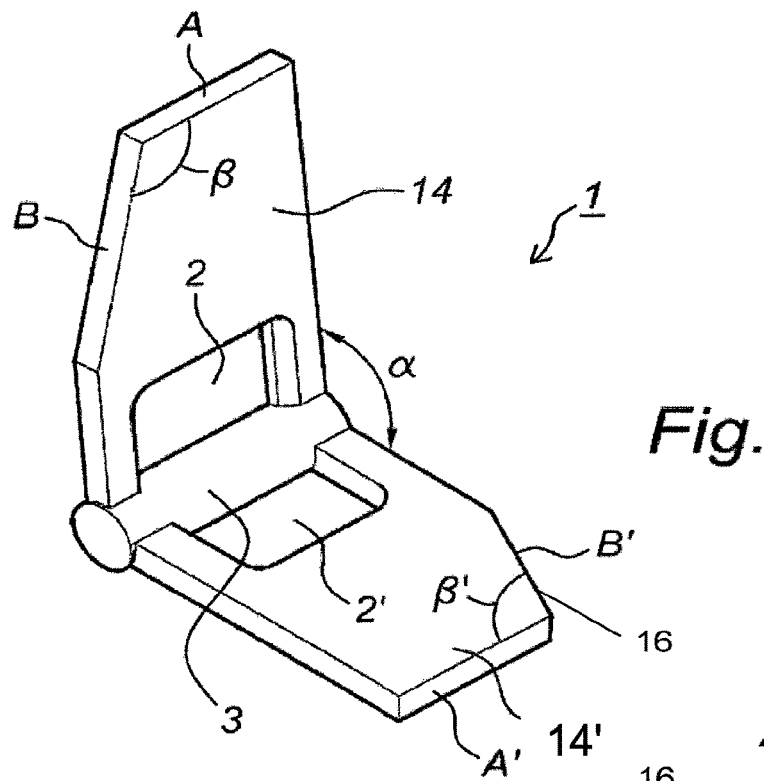

In the embodiments shown in FIGS. 2D and 2E, the leaves form an inner angle which is preferably an obtuse angle. Each of the leaves is provided with an aperture (2, 2').

As shown in FIG. 2E, the leaves (14, 14') are separated by an intersection (3), said intersection (3) has a rod-like appearance.

Each of said leaves (14, 14') is provided with a beveled edge (16), whereby the two intersecting sides A and B (or A' and B') form an angle ß(or ß'). Said angle ß is preferably an obtuse angle. Said angles of each leaves are on opposite sides seen from the intersection (3).

Figure 2F:
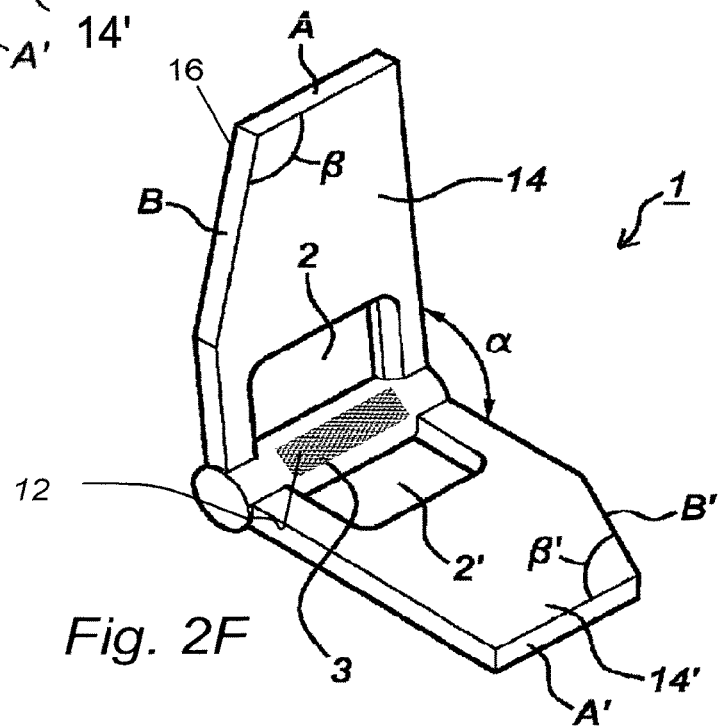

As shown in FIG. 2F, a peripheral roughening (12) may be located at the intersection (3). The peripheral roughening (12) is the same as the peripheral roughening described below with reference to FIGS. 5 and 6.

Figure 2G:
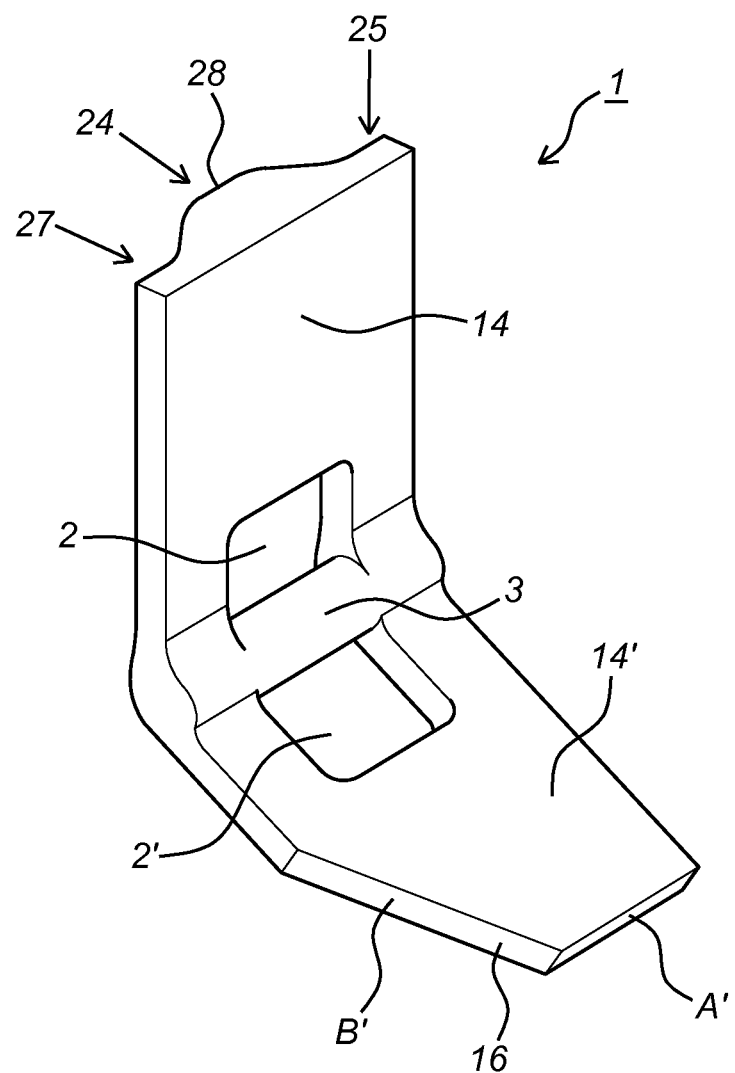
FIGS. 2G to 2J show potential embodiments of wall securement devices according to the present invention.

FIG. 2G shows an embodiment of the wall securement device (1) according to the present invention. In this embodiment, the device (1) comprises two leaves (14, 14') having a contact surface formed at their tip ends (being the tip ends of the wall securement device). These contact surfaces optionally cover parts of the front and/or rear main surfaces of the leaf (14, 14'). The leaf includes a protrusion (24) at its rear main surface. The other leaf may comprise intersecting sides A' and B', thereby featuring a beveled edge (16). Although shown as having substantially straight edges, intersecting sides A' and/or B' may have curved edges, semi-circular edges, or edges having any other shape that may facilitate installation of the device (1) into corner posts/corner profiles as, for example, as described below with reference to FIG. 3G. The wall securement device (1) may include a peripheral roughening (12) (shown in FIG. 2F). The peripheral roughening (12) may be located at the intersection (3).

As seen in FIG. 2G, the contact surface having the protrusion (24) may include a slope portion (25) to facilitate installation of the wall securement device (1) into a corner post/corner profile having, for example, restrictive dimensions. The contact surface having the protrusion (24) may include another slope portion (27) to facilitate ambidextrous (or bi-directional) installation of the wall securement device (1) into the corner post/corner profile, regardless of whether the corner post/corner profile is a right-hand or left-hand corner post/corner profile. The contact surface having the protrusion (24) may comprise a tip portion (28) to facilitate lock-in of the wall securement device (1) in the corner post/corner profile when fully installed. The surface of the leaf (14) opposite the contact surface may be substantially flat.

Figure 2H:
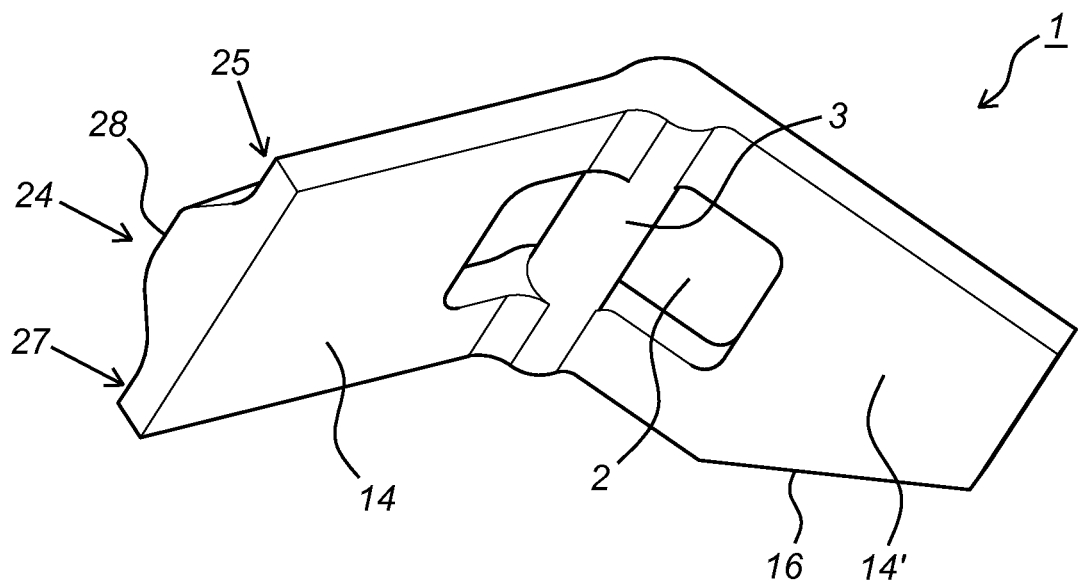

FIG. 2H shows a perspective side view of the embodiment of the wall securement device (1) shown in FIG. 2G. The protrusion (24) may be formed as a solid piece, with the front main surface of the leaf (14) being substantially flat and planar, as seen in FIGS. 2G and 2H.

Figure 2I:
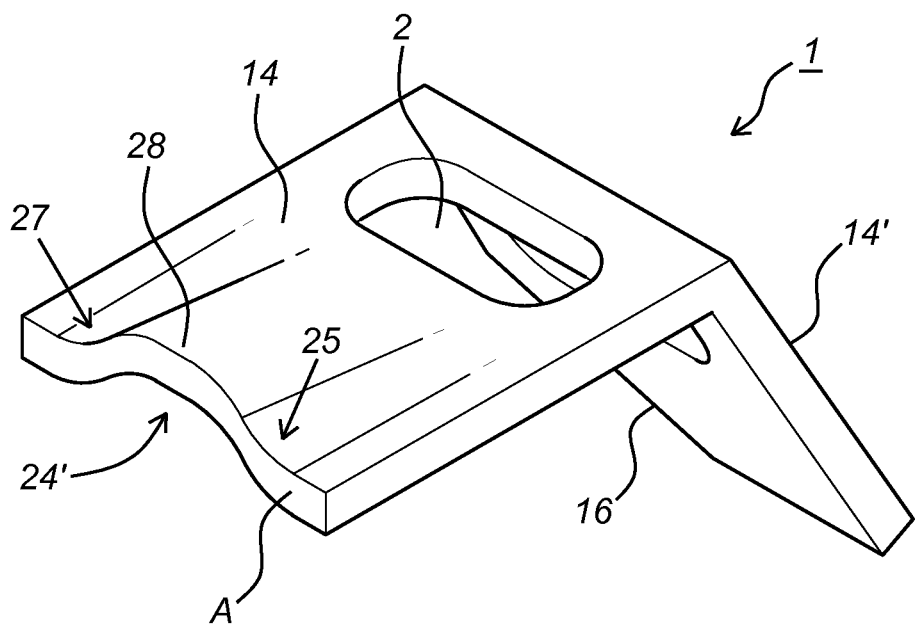

FIG. 2I shows another embodiment of the wall securement device (1) comprising one (or both) of the leaves (14, 14') having a contact surface that includes a protrusion (24). Similar to the embodiment in FIGS. 2G and 2H, the embodiment of the device (1) shown in FIG. 2I may have a contact surface having the protrusion (24) that comprises the slope portion (25 or 27) and the tip portion (28). Similarly, this embodiment of the device (1) may also include the second slope portion (27 or 25), so as to allow ambidextrous (or bi-directional) installation in the corner posts/corner profiles, thereby providing usage regardless of whether the corner posts/profiles are right-handed or left-handed. However, unlike the embodiment of the device (1) shown in FIGS. 2G and 2H, the front main surface of the leaf (14) may be contoured similar to (or in a form that that is different from) the contour of the rear main surface. According to a non-limiting embodiment, the surface of the leaf (14) opposite the rear main surface may be contoured similar to the front main surface, thereby reducing material (and weight) used to manufacture the device (1), while maintaining functionality as described herein. Additionally, this can provide for a straightforward realization of the protrusion, whereby part of the leaf material is dented in towards the rear side. The protrusion (24) may be manufactured in a single step with the rest of the device (1), or the protrusion (24) may be formed by bending the leaf (14) of the device (1) (e.g., shown in FIG. 2D) to take on the shape and form of the protrusion (24).

In the embodiment of FIG. 2I, one (or both) of the leaves (14, 14') may comprise the protrusion (24). The other leaf may comprise intersecting sides A' and B'. The wall securement device (1) may include a peripheral roughening (12) (shown in FIG. 2F). The peripheral roughening (12) may be located at the intersection (3).

Figure 2J:
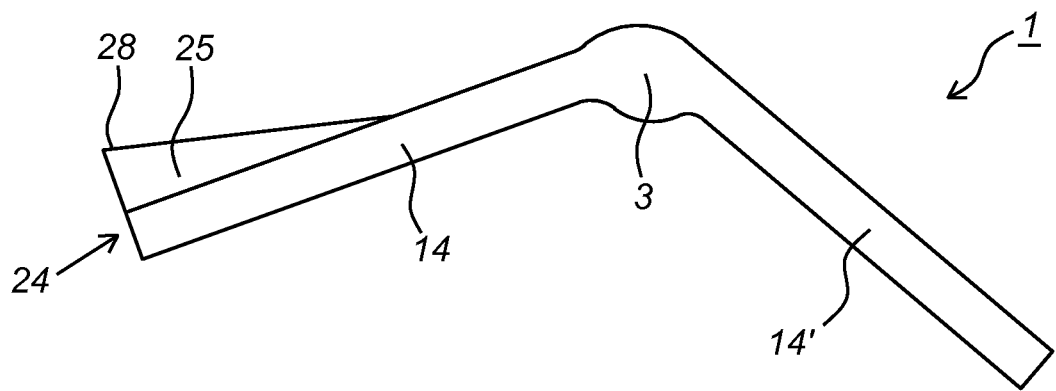
Figure 4A:
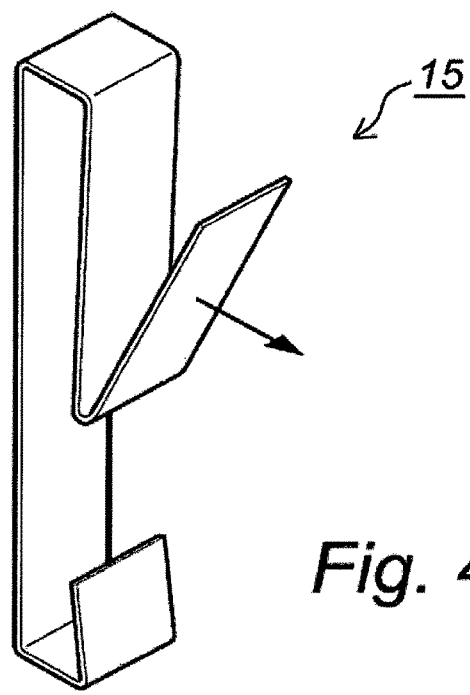
FIG. 4A shows an attachment aid according to a possible embodiment of the current invention.

FIG. 2J shows a side view of the embodiments of the wall securement device (1) of FIGS. 2G-2I, comprising one (or both (not shown)) of the leaves (14, 14') having a protrusion (24). The device (1), as discussed above, may include an attachment aids (15), which may comprise a metal element, preferably manufactured from spring steel, positioned or attached at the rear of the device (1) and which aids the clamping of the device (1) to the corner profile. Such an attachment aid (15) is shown in FIG. 4A. Alternatively, the device (1) may be provided with a foam element (15) at the rear side of the device.

Referring to FIGS. 2G-23, the tip portion (28) in the protrusion (24) may include, for example, a profiled cross-section, when inspecting the device tip end from its end face. Said profile may be substantially U-shaped and protruding towards the rear side (shown), V-shaped (not shown), W-shaped (not shown), circular (not shown), triangular (not shown), trapezoid (not shown), or it may have any other shape that may protrude to facilitate lock-in of the device (1) into position when installed in a corner post/corner profile. While the tip portion (28) is shown as having a maximum height closest to the edge, with the height tapering down on points closer to the intersection (3), the tip portion (28) may have a maximum height located anywhere on the main surface of the leaf (14, 14'). The slope portions (25, 27) may be substantially flat, or may have a sloped surface leading up to the tip portion (28).

Figure 2K:
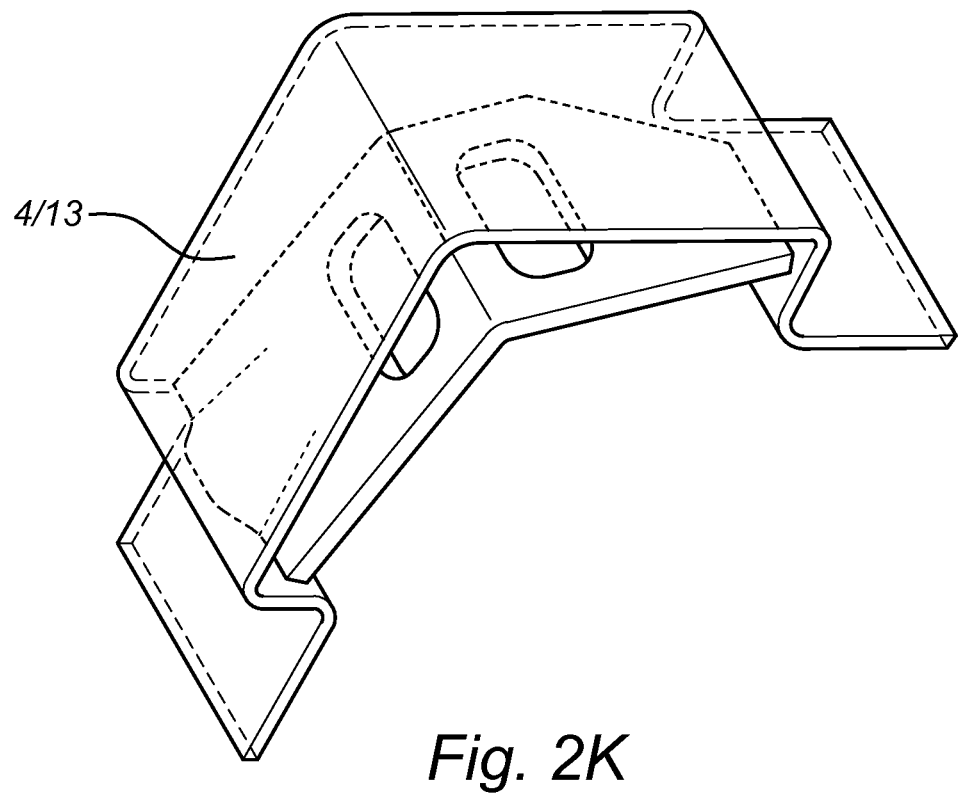
FIG. 2K shows a corner post/profile with a wall securement device according to an embodiment of the present invention installed.

FIG. 2K shows an example of the wall securement device (1) of FIG. 23 (or FIG. 2H) installed in a corner post/corner profile (4, 13). The dimensions of the device (1) may be selected so as to provide a snug and secure fit of the device (1) in a corner post/corner profile when installed and positioned in the lock-in position (discussed below with reference to FIG. 3F).

The wall securement device may be attached to the corner posts of the container. The devices may be fixedly or removably attached. Attachment may occur by mechanical means (welding, gluing, magnetism) or by physical means (e.g. by friction).

Figure 3A:
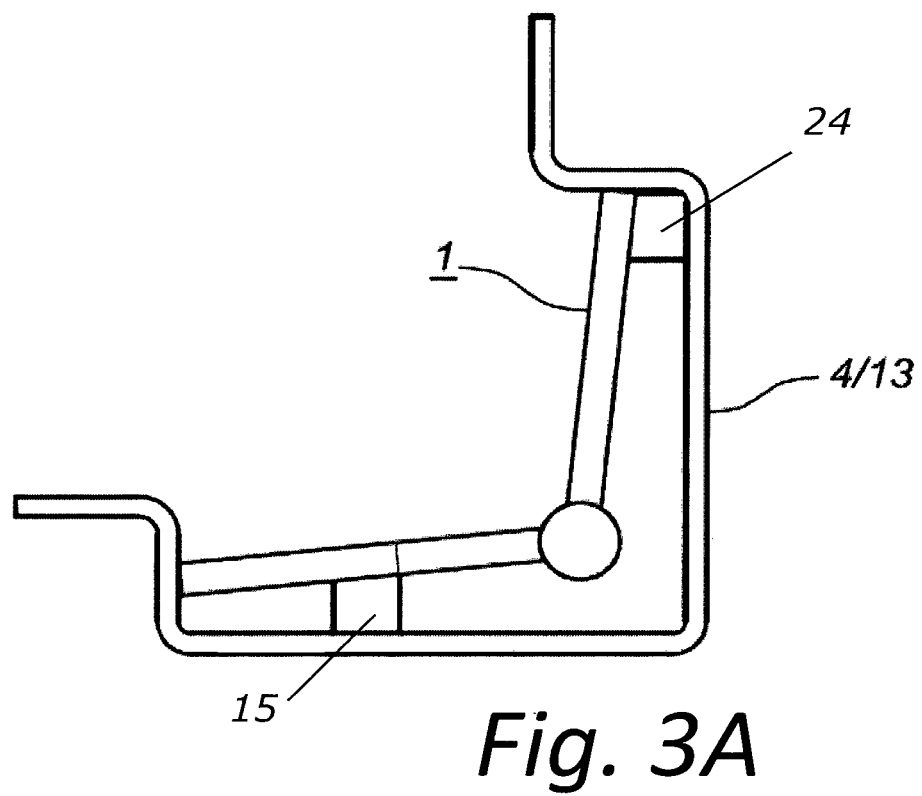
FIG. 3A gives a top view on a corner post with a wall securement device according to an embodiment of the prior art installed.

FIG. 3A shows a detail of a preferred embodiment of a wall securement device according to the current invention installed in the corner profile of a corner post. The device (1) is positioned in the corner post, with two sides parallel to the intersection (3) positioned against the wall of the corner post. The device (1) is positioned on a certain distance from the edge of the corner post. The latter is important, as otherwise the device risks to 'escape' the corner post whilst securing the load. Due to the angle formed by the leaves (14, 14') of the device (1), a space between device and wall, suitable for passage of the straps, is formed. It is seen that the device has two relatively small, line-shaped supports against the corner profile, respectively near the two tip portions of the device leaves (14,14'). Additionally, the device comprises a rigid, solid protrusion (24), equally supported against the corner profile (13). Moreover, it includes a foam attachment aid (15) that prevents the device (1) from sliding down.

Figure 3B:
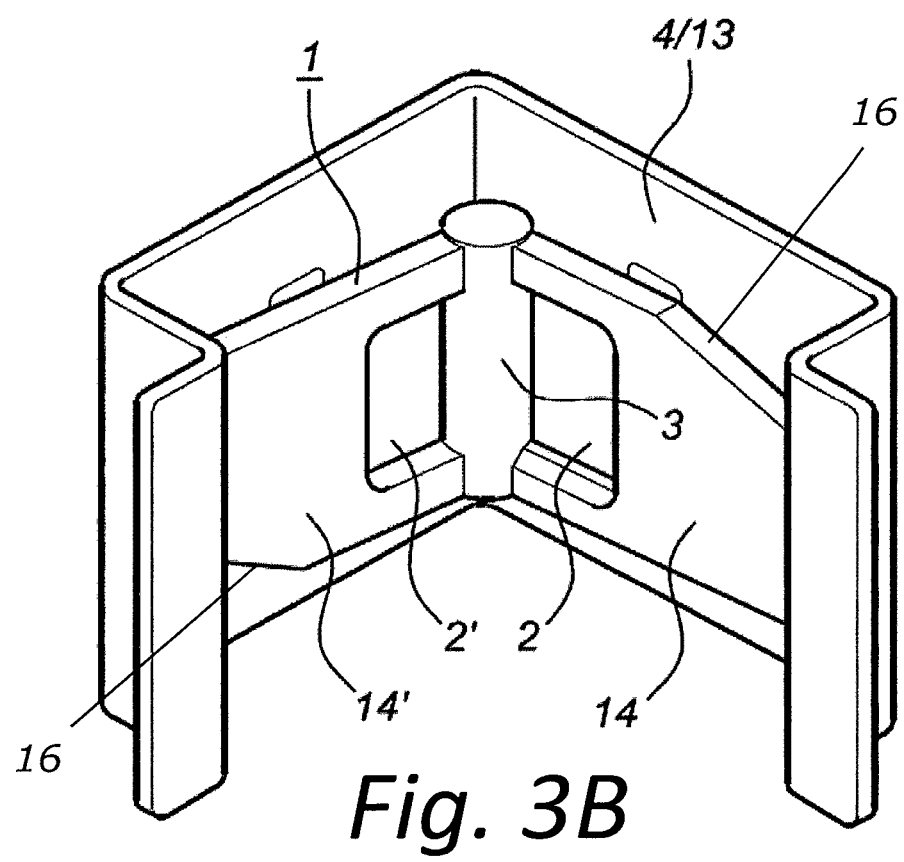
FIG. 3B gives a perspective view on a corner post with a wall securement device according to an embodiment of the prior art installed.
Figure 3E:
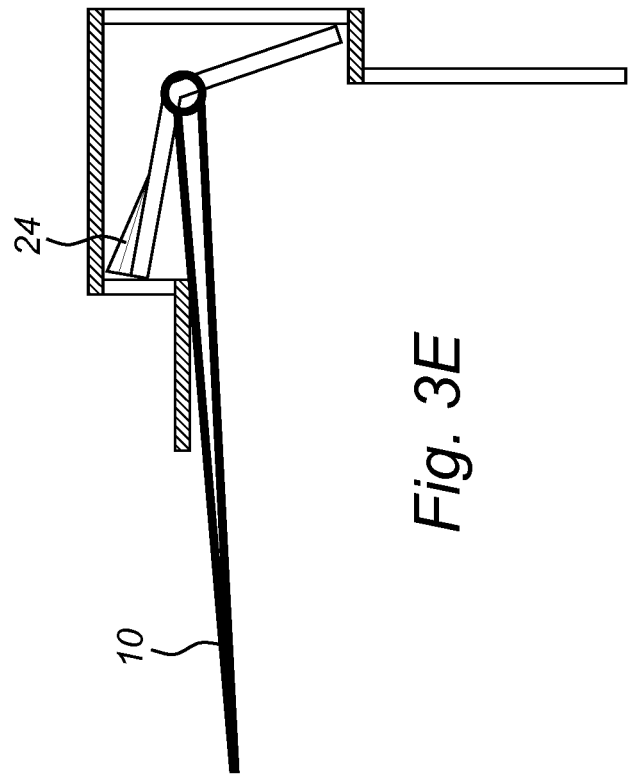
FIGS. 3D-3E depict two top views on corner posts/profiles of a container, with wall securement devices according to embodiments of the present invention installed.

FIG. 3B shows a device (1) positioned in a corner post used for securing a load with straps. Such an arrangement is applicable to devices according to the present invention. A strap will be brought through the first aperture (2) via a first pathway, and secondly through the second aperture (2'), in a direction substantially opposite to the direction of the first pathway of the strap. F shows a direction of a force that may be applied to the straps. The force F may be applied in a direction that is opposite to the direction shown in FIG. 3B. Rather than the strap being positioned so that it runs from the interface and to the right of the illustration in FIG. 3B, the strap may be positioned so that it runs from the interface and to the left of the illustration in FIG. 3B. The direction of the applied force F will be equally opposite to the direction of the first when securing a load, the direction of the first strap-pathway. Preferably, the protrusion (not shown on the figure) at the rear main surface of at least one of both leaves contacts the corner profile (13).

FIG. 3C shows a view of the device (1) having a leaf 14 (or 14') with a slope-protrusion (24) positioned in the corner post, used for securing a load with straps. As seen in FIG. 3C, the device (1) may be installed in a plane of application (D) with a direction of force (F) to be applied to the device (1) by the strap.

Figure 3D:
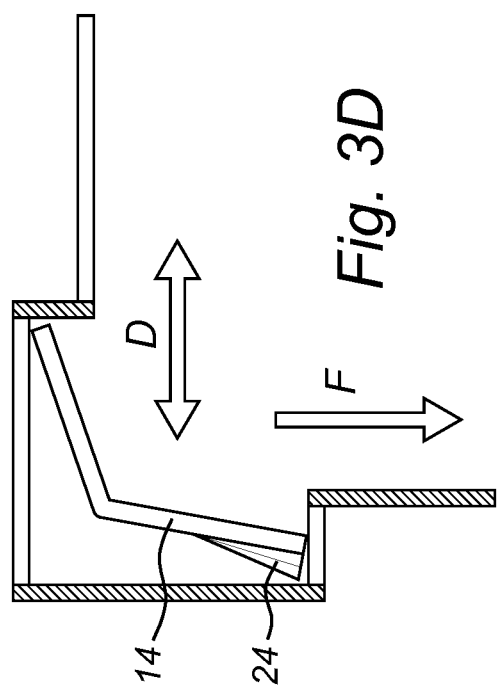

FIG. 3D shows a strap (10) installed in the device (1). The device (1) has two leaves (14), one of which is provided with a protrusion (24) towards its rear side. It is seen that the pulling force, exerted on the device via the strap, extends in a direction not so different from the direction into which the latter leaf extends. As a consequence of the protrusion (24) being provided in said leaf, it can resist to much higher pulling forces. Moreover, said protrusion (24) comprises a tip portion, such that it provides a larger contact surface, since latter contact surface is curved. As a result, upon exerting high pulling forces, there is less risk on the container getting damaged/dented. Additionally, the device is designed such that the intersection (3) is located in the neighborhood of an imaginary rib of the cuboid container space. This is advantageous for the provision of the strap.

Figure 3F:
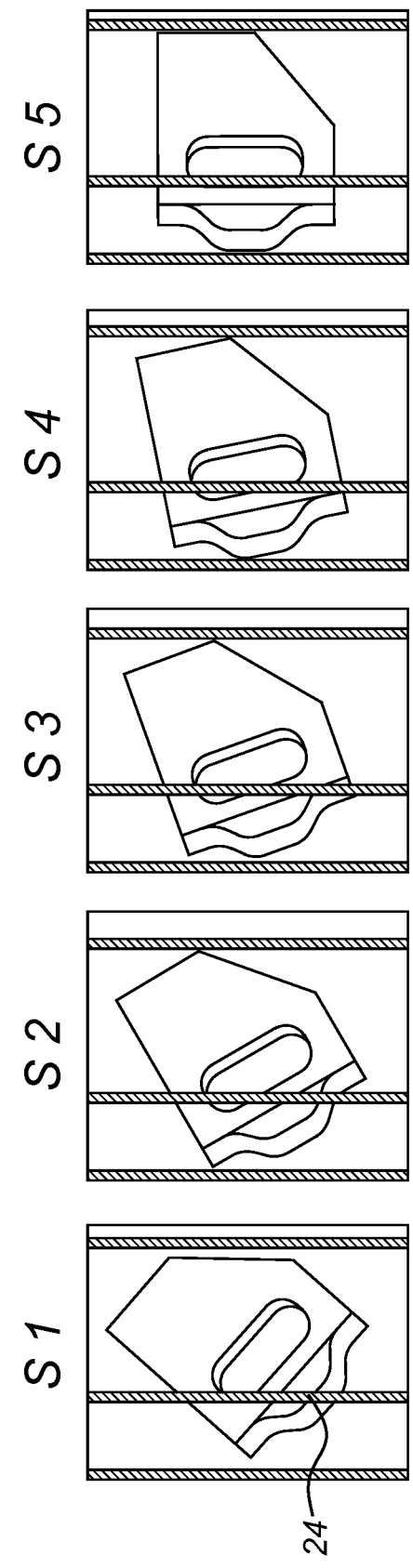
FIG. 3F shows various stages of installing a wall securement device according to an embodiment of the present invention, in a corner post/profile of a container.

FIG. 3F shows stages S1 to S5 for installing the device (1) (for example, device (1) of FIG. 2H or 2J) into a corner post. Initially, the device (1) (e.g., of FIG. 2G or 2I) may be inserted into the corner post at a particular angle, such as, for example 45° as seen in stage S1. The device (1) may then be pivotally adjusted as shown in stages S2, S3, S4, until it is positioned in a lock-in position, as shown in stage S5. As seen in FIG. 3G, as the device (1) is pivotally adjusted, it reduces the space while rotating (stages S2 to S4) until it reaches the lock-in position (stage S5), at which point it may be securely and snuggly positioned within corner post/corner profile (4, 13).

As seen in FIG. 3F, the device (1) of FIG. 2G (or FIG. 2I) may be configured to provide space when putting the device (1) (e.g., stage S1) in the corner post/corner profile, and to reduce space as the tip portion (28) moves (stages S2 to S4) into lock-in position (stage S5) when being rotated, thereby locking the device (1) in the optimal position in the corner post/corner profile. To this end, the protrusion comprises at least one slope portion. In the embodiments on the figures, the device comprises slope portions at either side of the protrusion; in other words, the protrusion is a bump. As seen in the Figures, the same device (1) may thus be used for both right or left-hand side applications.

The protrusion (24) comprises two sloped portions, such that the device (1) can be conveniently arranged in both left- and right-handed corner profiles.

In order to ensure adequate attaching to the corner post, the device according to the current invention may be provided with attachment aids (15).

FIG. 4A shows an embodiment of such an attachment aid (15). Attachment aids (15) may comprise a metal element, preferably manufactured from spring steel, positioned or attached at the rear of the device (1) and which aids the clamping of the device (1) to the corner profile (13). Preferably, the metal element thereby encompasses one of the leaves, with an elastically deformable member pointing in a rearwardly direction with respect to the device.

It is not necessary for the attachment aid (15) to be a separately formed part. By choosing a proper design, especially with regard to material and thickness, the attachment aid (e.g. a spring element) may be formed as an integral part of the device.

Figure 4B:
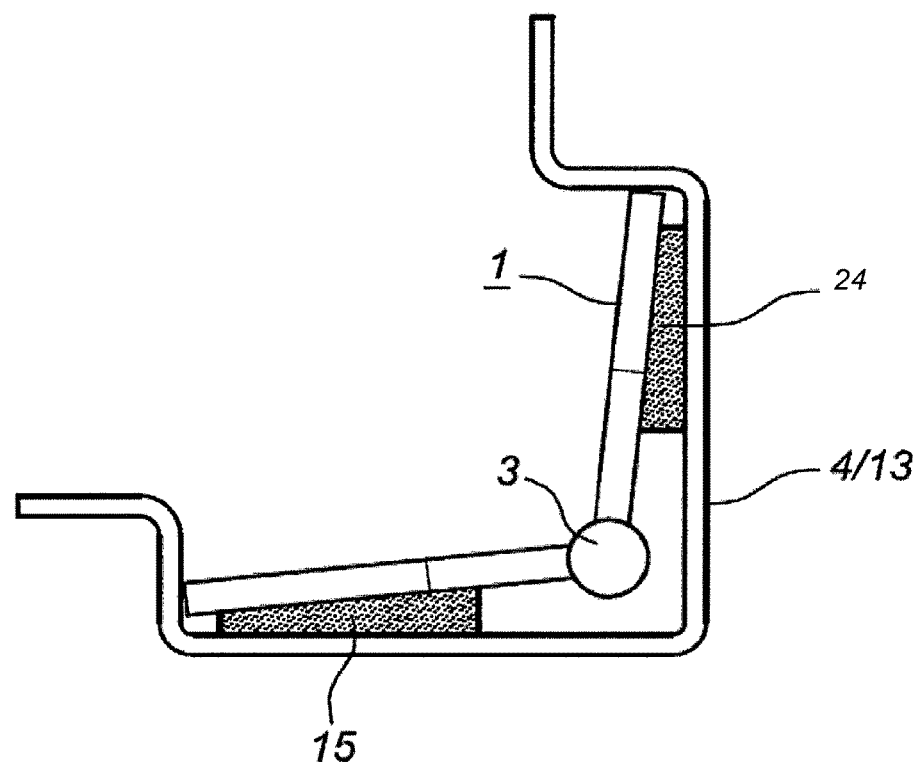
FIG. 4B gives a top view on a securement device according to an embodiment of the present invention, installed into a corner profile of a container.

Alternatively, as shown in FIG. 4B, the device may be provided with an elastic/deformable foam element (15), and with a rigid/solid protrusion (24) at the rear side. The protrusion (24) may be in metal, and it may be integrally formed with the remainder of the divide (1).

Preferably, the attachment aid (15) exerts a pressing force against the corner profile, thereby preventing the wall securement device (1) from spontaneously slipping/falling down, once it has been arranged at the corner profile (13). The protrusion (24), on the other hand, provides a rigid support to the device (1).

Figure 4C:
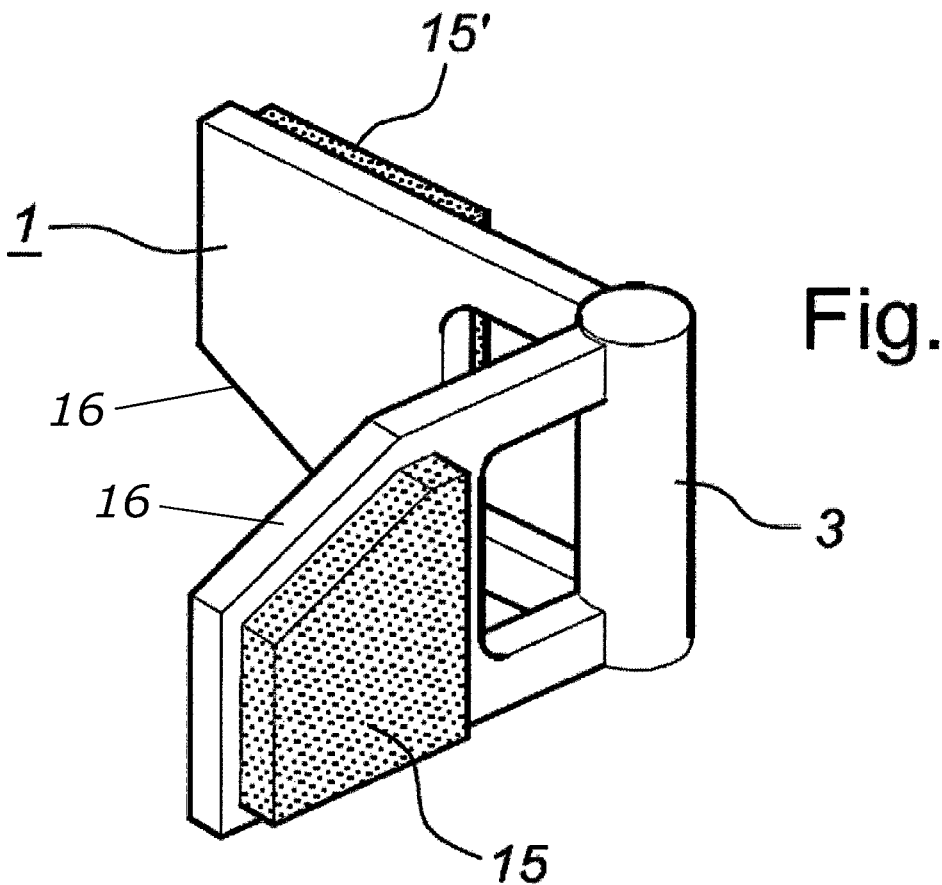
FIG. 4C gives a perspective view on a securement device according to an embodiment of the present invention.

In a similar fashion, as shown in FIG. 4C, either one of the attachment aids (15, 15') may be replaced by a rigid, solid protrusion, and preferably said protrusion is integrally formed with the leaf (14) of the device.

In the present invention, the leaves may have one or more protrusions at their rear main surface, optionally supplemented with attachment aids as described herein, at their front and/or rear main surfaces.

Figure 5:
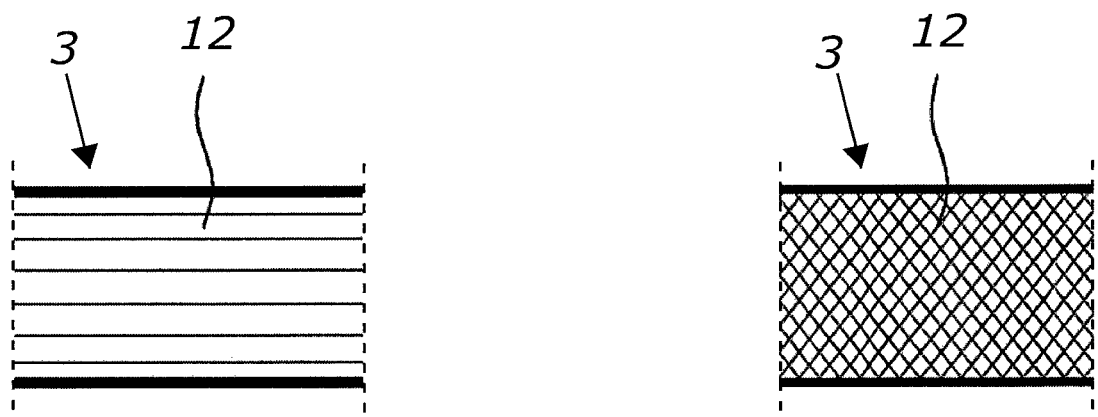
FIG. 5 gives a view of an intersection of a wall securement device having a peripheral roughening, according to two embodiments (left and right hand side) of the present invention.
Figure 6:
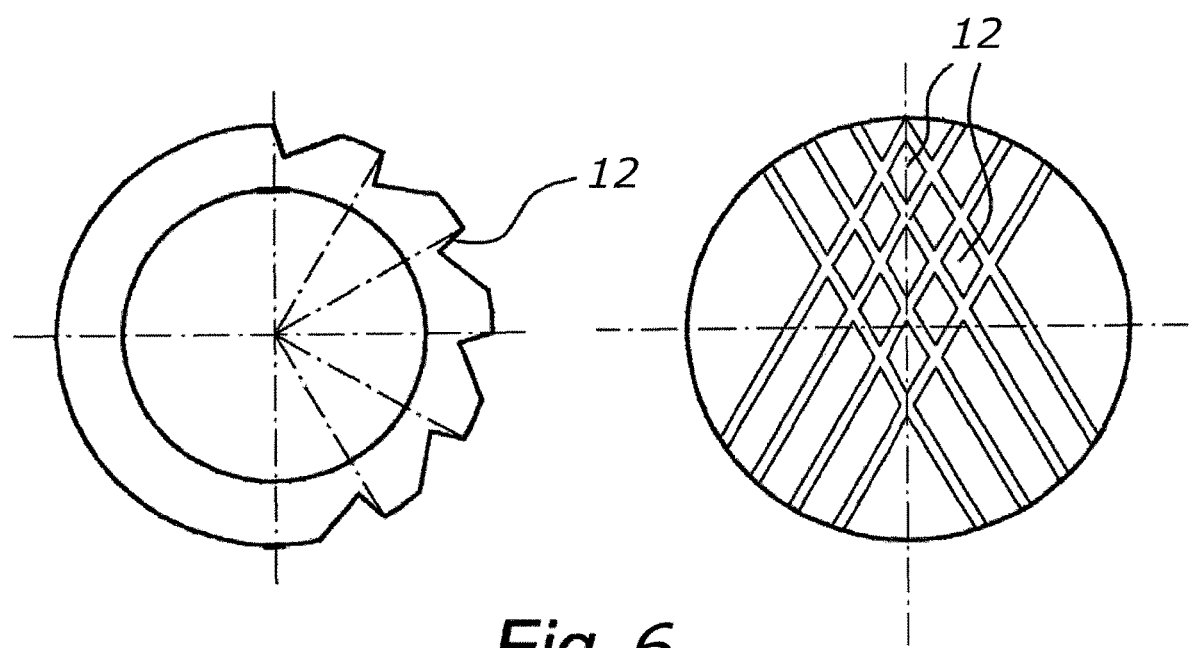
FIG. 6 respectively shows a cross-section (left hand side), and detail of the surface (right hand side) of the intersection of a wall securement device having a peripheral roughening, according to an embodiment of the present invention.

As is shown in FIGS. 5 and 6, the intersection (3) may be provided with peripheral roughening (12). This roughening (12) may take the form of a serration of a grid.

THE ELEMENTS ON THE FIGURES ARE

1. Wall securement device
2. Aperture
3. Intersection
4. Corner post
10. Strap
11. Load
12. Peripheral roughening
13. Corner profile
14. Leaf
15. Attachment aids
16. Beveled edge
24. Protrusion
25. Slope portion
27. Slope portion
28. Tip portion
A. Intersecting side
B. Intersecting side The present invention is not restricted to any form of realization described previously and that some modifications can be added to the presented example without reappraisal of the appended embodiments.

Although process steps, method steps, or the like, may be described in a sequential order, such processes or methods may be configured to work in alternate orders. In other words, any sequence or order of steps that may be described does not necessarily indicate a requirement that the steps be performed in that order. The steps of the processes or methods described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

While the invention has been described in terms of exemplary embodiments, those skilled in the art will recognize that the disclosure can be practiced with modifications in the spirit and scope of the appended claims. These examples are merely illustrative and are not meant to be an exhaustive list of all possible designs, embodiments, applications, or modifications of the invention.

The invention claimed is:

1. A securement device attachable to an inner rigid structure of a container that comprises a sidewall and a corner post to secure a load in the container, the securement device comprising:
at least two leaves, said leaves having a front main surface and a rear main surface, and further having a contact surface extending between the front and rear main surfaces, the contact surface being formed at a tip portion of the leaf to contact a profile of the corner post,
wherein at least one of said leaves comprises at least one aperture that extends between the front and rear main surfaces, said device comprising at least two such apertures and an intersection positioned between said at least two such apertures to receive a strap, characterized in that the rear main surface of the leaf comprises a protrusion that is rigid and solid and integrally formed with the rear main surface at an end of the leaf, away from said intersection.

2. The securement device of claim 1, wherein the protrusion comprises a slope portion.

3. The securement device according to claim 1, wherein the protrusion comprises a tip portion.

4. The securement device according to claim 1, wherein the protrusion comprises a bump.

5. The securement device according to claim 1, wherein the device is arranged such that, when it is installed at the corner post, it does not extend beyond an inner zone of said corner post.

6. The securement device according to claim 1, wherein the at least two leaves include a first leaf comprising a first aperture of said at least two such apertures and a second leaf comprising a second aperture of said at least two such apertures.

7. The securement device of claim 6, wherein said first leaf and said second leaf form an inner angle of between about 45° and about 180°.

8. The securement device of claim 6, wherein said first leaf and said second leaf form an inner angle of between about 90° and about 120°.

9. The securement device according to claim 6, wherein the intersection is positioned to support a portion of the strap when passed through at least one of said first aperture and said second aperture.

10. The securement device of claim 9, wherein the intersection extends in a direction traversing a direction of strain of the strap.

11. The securement device according to claim 9, wherein said first aperture and said second aperture occupy between about 10% and about 80% of the front or rear main surfaces of the device.

12. The securement device of claim 11, wherein said first aperture and said second aperture occupy between about 25% and about 60% of the front or rear main surfaces of the device.

13. The securement device according to claim 9, further comprising a peripheral roughening.

14. The securement device of claim 13, wherein the peripheral roughening is located on said intersection.

15. The securement device according to claim 1, further comprising attachment aids for assisting the attachment of said device to said corner post.

16. A method for securing a load in a container using a securement device according to claim 1, said container comprising three side walls, a roof, a floor, and four corner posts, which corner posts define corner profiles, said method comprising:
attaching said wall securement device to one of the four corner posts, thereby arranging at least the protrusion of said securement device to contact the corner profile of said corner post;
passing a strap through said at least one aperture; and
lashing said load using said strap.

17. A method for securing a load in a container, comprising:
installing a securement device in a corner post of the container;
rotating the securement device in the corner post of the container; and
attaching a strap to the securement device,
wherein the securement device comprises at least two leaves, said leaves comprising
a front main surface,
a rear main surface,
an intersection positioned between said leaves;
a protrusion that is rigid and solid and integrally formed with the rear main surface at an end of one of the at least two leaves, away from said intersection, and
a contact surface extending between the respective front and rear main surfaces, the contact surface being formed at a tip portion of at least one of said at least to leaves to contact a profile of the corner post, and wherein at least one of said leaves comprises at least one aperture that extends between the front and rear main surfaces, said securement device comprising at least two such apertures to receive the strap.

18. The method in claim 17, wherein the step of installing the securement device in the corner post of the container comprises inserting the securement device in a corner profile of the corner post.

19. The method in claim 17, wherein the step of rotating the securement device in the corner post of the container comprises pivotally adjusting the securement device until it is positioned in a lock-in position.

20. The method in claim 18, wherein said at least two leaves form a 45° angle.

* * * * *